(12) United States Patent
Glazer et al.

(10) Patent No.: US 7,845,345 B2
(45) Date of Patent: Dec. 7, 2010

(54) SOLAR-POWERED SYSTEM AND METHOD FOR PROVIDING UTILITIES

(76) Inventors: Cheryl Glazer, 8128 Hampton Glen Dr., Tampa, FL (US) 33647; Elliott Glazer, 8128 Hampton Glen Dr., Tampa, FL (US) 33647; Steven Glazer, 8128 Hampton Glen Dr., Tampa, FL (US) 33647

( * ) Notice: Subject to any disclaimer, the term of this patent is extended or adjusted under 35 U.S.C. 154(b) by 348 days.

(21) Appl. No.: 12/101,052

(22) Filed: Apr. 10, 2008

(65) Prior Publication Data

US 2009/0255527 A1    Oct. 15, 2009

(51) Int. Cl.
    *F24J 2/10*    (2006.01)
(52) U.S. Cl. ............... 126/688; 126/600; 126/683; 126/684; 126/690; 60/641.15; 60/641.8
(58) Field of Classification Search ........... 126/600; 60/641.8, 641.15
    See application file for complete search history.

(56) References Cited

U.S. PATENT DOCUMENTS

| | | | | |
|---|---|---|---|---|
| 2,636,129 A * | 4/1953 | Agnew | ............... | 290/2 |
| 3,939,803 A * | 2/1976 | Meissner et al. | ............... | 122/31.1 |
| 4,063,419 A * | 12/1977 | Garrett | ............... | 60/641.8 |
| 4,079,591 A * | 3/1978 | Derby et al. | ............... | 60/641.8 |
| 4,191,901 A * | 3/1980 | Branover | ............... | 310/11 |
| 4,197,446 A * | 4/1980 | Kalmanoviz | ............... | 392/461 |
| 4,215,553 A * | 8/1980 | Poirier et al. | ............... | 60/650 |
| 4,232,523 A * | 11/1980 | Derby et al. | ............... | 60/641.15 |
| 4,249,514 A * | 2/1981 | Jones | ............... | 126/605 |
| 4,261,332 A * | 4/1981 | Stewart | ............... | 126/563 |
| 4,448,039 A * | 5/1984 | Hutchins | ............... | 62/235.1 |
| 4,462,213 A * | 7/1984 | Lewis | ............... | 60/641.8 |
| 4,760,705 A * | 8/1988 | Yogev et al. | ............... | 60/651 |
| 4,921,580 A * | 5/1990 | Martes et al. | ............... | 202/205 |
| 4,942,736 A * | 7/1990 | Bronicki | ............... | 60/641.12 |
| 4,978,458 A * | 12/1990 | Inagaki et al. | ............... | 210/748.09 |
| 5,461,496 A * | 10/1995 | Kanada et al. | ............... | 359/592 |
| 5,578,140 A * | 11/1996 | Yogev et al. | ............... | 136/246 |
| 5,650,875 A * | 7/1997 | Kanada et al. | ............... | 359/592 |
| 6,057,504 A * | 5/2000 | Izumi | ............... | 136/246 |
| 6,360,542 B1 * | 3/2002 | Luo | ............... | 60/641.15 |
| 6,367,257 B1 * | 4/2002 | Witt et al. | ............... | 60/641.15 |
| 6,604,521 B2 * | 8/2003 | Smith et al. | ............... | 126/657 |
| 6,619,283 B2 * | 9/2003 | Ghela | ............... | 126/692 |
| 6,668,555 B1 * | 12/2003 | Moriarty | ............... | 60/641.8 |
| 6,701,711 B1 * | 3/2004 | Litwin | ............... | 60/641.11 |
| 6,926,440 B2 * | 8/2005 | Litwin | ............... | 374/124 |
| 6,957,536 B2 * | 10/2005 | Litwin et al. | ............... | 60/641.8 |
| 6,996,988 B1 * | 2/2006 | Bussard | ............... | 60/641.8 |
| 7,171,812 B2 * | 2/2007 | Schubert | ............... | 60/641.15 |

(Continued)

FOREIGN PATENT DOCUMENTS

JP        2007291908 A  * 11/2007

*Primary Examiner*—Kenneth B Rinehart
*Assistant Examiner*—Jorge Pereiro
(74) *Attorney, Agent, or Firm*—Snell & Wilmer L.L.P.

(57) ABSTRACT

A solar-powered system and method for producing a utility, such as electricity, hot water, and/or potable water is disclosed. The system may be configured to produce the utilities alone or in combination. The system may comprise a fluid medium, a converter, one or more solar concentrators, a storage tank, a collection tank, a dehydration tank, and one or more safety features. The system may be closed-loop or open-loop.

5 Claims, 9 Drawing Sheets

U.S. PATENT DOCUMENTS

| | | | |
|---|---|---|---|
| 7,185,493 B1 * | 3/2007 | Connelly | 60/641.15 |
| 7,340,899 B1 * | 3/2008 | Rubak et al. | 60/641.8 |
| 7,677,042 B2 * | 3/2010 | Johnston | 60/641.11 |
| 2003/0047180 A1 * | 3/2003 | Smith et al. | 126/657 |
| 2003/0047181 A1 * | 3/2003 | Ghela | 126/684 |
| 2005/0198959 A1 * | 9/2005 | Schubert | 60/641.8 |
| 2007/0227532 A1 * | 10/2007 | Mehler | 126/640 |
| 2008/0121225 A1 * | 5/2008 | Kuckelkorn et al. | 126/635 |
| 2009/0199557 A1 * | 8/2009 | Bennett | 60/641.15 |
| 2009/0288410 A1 * | 11/2009 | Wolter | 60/517 |

* cited by examiner

SOLAR-POWERED SYSTEM AND METHOD FOR PROVIDING UTILITIES

FIELD OF INVENTION

The present invention generally relates to a renewable energy system, and more specifically, to a solar-powered system and method for providing utilities such as electricity, hot water and/or potable water.

BACKGROUND OF THE INVENTION

Petroleum currently provides about 85% of the energy consumed in the United States, including energy used to provide utilities such as electricity and hot water. Unfortunately, the United States is largely dependent upon foreign countries for its supply of petroleum, and the availability of supply from these nations is dependent upon a number of factors. For example, a petroleum shortage can be caused by natural disasters, terrorist attacks, cartels, and government instability in the oil-rich nations. A reduction in petroleum supply may cause a price increase of utilities and/or an energy blackout.

Various conventional renewable energy systems and methods have been developed to reduce our dependence on petroleum. For example, various systems have been developed to harness wind, solar and hydro power. However, such systems have had limited efficacy, and are more expensive per unit of renewable energy produced than petroleum-based energy.

As such, a need exists for a cost-efficient system and method for providing one or more utilities from a renewable energy power source, such as solar energy.

SUMMARY OF THE INVENTION

The invention generally relates to solar-powered systems and methods for producing one or more utilities. The system may be configured to produce any type of power, such as electricity and/or mechanical work. An exemplary power-producing system comprises a fluid medium and a converter, wherein the fluid medium has an energy (i.e., potential and/or kinetic energy) that has been increased by solar power.

The system may be open or closed loop, and may comprise various features such as one or more solar concentrators, storage tanks for storing the fluid medium, various energy enhancing devices, collection tanks, dehydration systems, safety features, and the like. In an exemplary embodiment, a fluid medium such as water or air is supplied to a storage tank. Solar energy is applied to storage tank, causing the medium to increase in energy. The energized medium exits the storage tank via a conduit and is transported to a converter to produce electricity.

In an exemplary embodiment, the system may comprise a solar concentrator, such as a mirror, prism, or other device capable of focusing solar energy on the storage tank, thereby heating the fluid medium located within. The fluid medium exiting the converter may be stored in a collection tank or recycled back to the storage tank for reuse. In another exemplary embodiment, any residual medium in the storage tank is transported via a waste conduit to a dehydration tank. The dehydration tank may comprise a solar concentrator which further dehydrates the materials creating a solid waste product. The purified water may then be recycled back to the storage tank via a conduit.

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

DETAILED DESCRIPTION

The present invention is described herein and includes various exemplary embodiments in sufficient detail to enable those skilled in the art to practice the invention, and it should be understood that other embodiments of different design, construction, modifications and uses may be realized without departing from the spirit and scope of the invention. Thus, the following detailed description is presented for purposes of illustration only, and not of limitation, and the scope of the invention is defined solely by the appended claims. The particular implementations shown and described herein are illustrative of the invention and its best mode and are not intended to otherwise limit the scope of the present invention in any way.

In general, the present invention uses solar energy to produce one or more utilities, such as electricity, potable water, and/or hot water. Various components of the system may be used alone or may be combined to produce the desired utilities. For example, the system may be configured to produce a single utility, such as electrical power. In other embodiments, the primary utility produced is potable water or hot water. Moreover, the system may be configured to primarily produce potable and/or hot water, with electricity produced as a side benefit, or may be configured to primarily produce power, with potable water and/or hot water produced as a side benefit. It will be understood that the presently disclosed system may be adapted to produce any desired combination of utilities in any desired quantity.

The system is suitable for use in connection with any structure or system. For example, the system may be used to provide one or more utilities to homes, businesses, vehicles, boats, yachts, and/or the like. Moreover, the invention is suitable for use on any scale, such residential, commercial, community, and global use.

Figure 1:
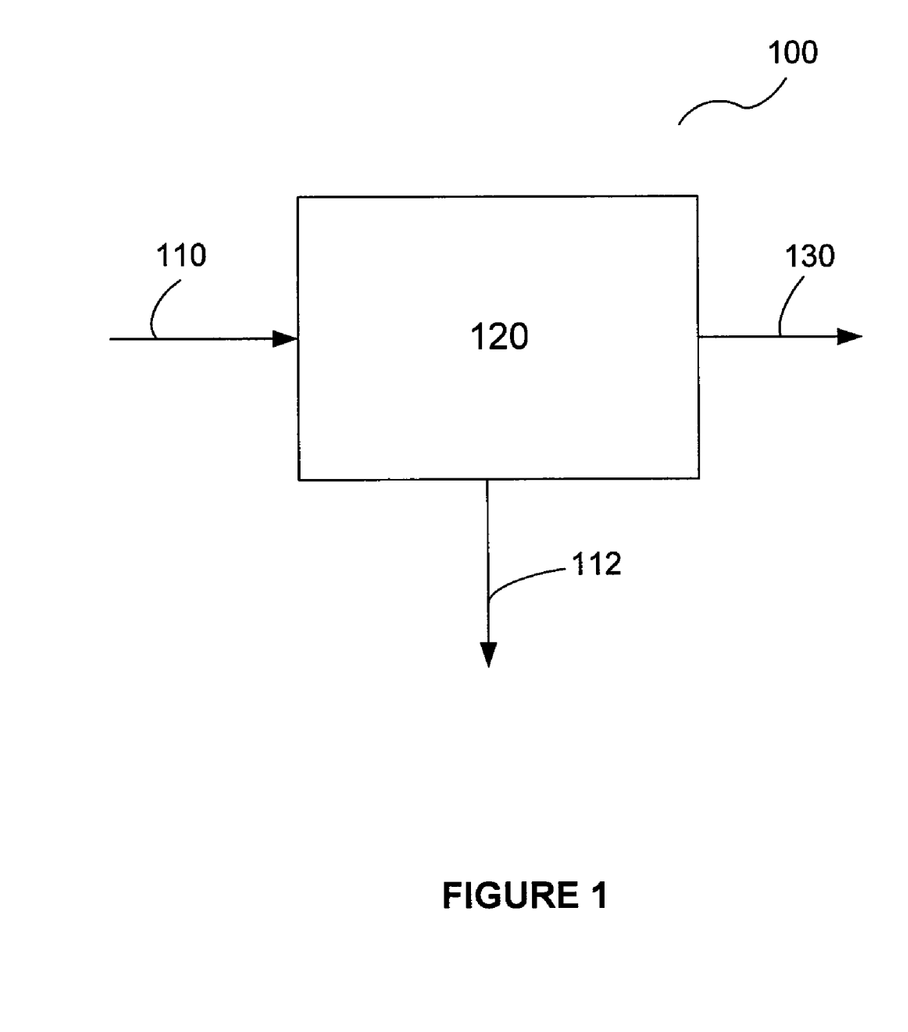
FIG. 1 is a schematic of a system for providing power using solar energy, in accordance with an embodiment of the present invention.

The system uses solar power to produce any type of power, such as electricity and/or mechanical work. An exemplary power-producing system comprises a medium and a converter. In accordance with an aspect of the present invention, the medium has an energy (i.e., potential and/or kinetic energy) that has been increased by solar power. FIG. 1 shows exemplary system 100 in which medium 110 having a solar-power enhanced energy is supplied to converter 120 to produce power 130. De-energized medium 112 exiting converter 120 may be discarded, or re-energized using solar power and recycled back into converter 120. In other exemplary embodiments, the medium may be released into the environment or may be collected and stored for use.

The medium may be any material which sufficiently increases in energy (i.e., temperature, pressure, and/or velocity) when solar energy is applied. The medium may be compressible or incompressible. In one exemplary embodiment, the medium is water, which may be transformed into steam upon application of solar energy. The water may be fresh or salt water, and may be supplied from any available source, such as from a lake, river, or ocean. The medium may also comprise other fluids such as silicon or mercury, or may be a gas, such as air. In an exemplary embodiment, the medium is a solid, such as uranium, which energizes upon application of solar energy. The fluid medium may be continuously or intermittently supplied to the converter, depending on the utility needs of the user.

A converter may be any device which partially or fully transforms the energy of a fluid medium into usable power. In an exemplary embodiment, the converter may be a conventional rotary engine, such as a turbine or piston assembly. The converter may comprise any number of blades, rotors, vanes and/or other mechanical parts which may be suitably set in motion by the pressure and/or momentum of the medium, thus creating power. In accordance with an exemplary embodiment, the converter is selected based upon suitability for use with the selected fluid medium. For example, a converter may be a steam turbine, gas turbine, or water turbine. It will be understood that a converter may include any suitable type of engine technology. Moreover, a converter may be any desired size and/or shape, and may comprise any desired configuration or mechanical parts and fall within the scope of the present invention.

In an exemplary embodiment, the system may comprise a storage tank configured to contain the medium and facilitate the application of solar energy to the medium. A storage tank may be any desired size and/or shape and may comprise any material that is suitably rigid so as to partially or fully retain its structure when containing a heated medium, such as steam. In an exemplary embodiment, the container comprises a material which facilitates absorption and/or retention of the solar energy. Examples include plastics, metals and fiberglass. Moreover, the container may be substantially transparent or may be opaque, and may comprise a heat-absorbing color, such as black or other dark colors. For example, with reference to system 200 in FIG. 2, medium 210 is supplied to storage tank 215. Solar energy 220 is applied to storage tank 215, causing medium 210 to increase in energy. Energized medium 212 exits storage tank 215 and is transported to converter 230 via conduit 217. The pressure and momentum of energized medium 210 activate converter 230, producing utility 235.

In an exemplary embodiment, various system components may comprise one or more energy enhancing devices. An energy enhancing device may be any structure configured to further enhance the energy of the fluid medium. For example, the storage tank and/or conduit may comprise one or more nozzles configured to increase the kinetic energy (i.e., velocity) of the fluid medium. In the exemplary system 200 shown in FIG. 2, storage tank 215 comprises a substantially funnel-shaped exit portion 220 connected to conduit 217. Exit portion 220 has a narrowing cross-sectional area configured to increase the kinetic energy of the exiting medium. It will be understood that any conventional or hereinafter devised structure which further enhances the energy of the fluid medium may be used in connection with the present invention.

Figure 2:
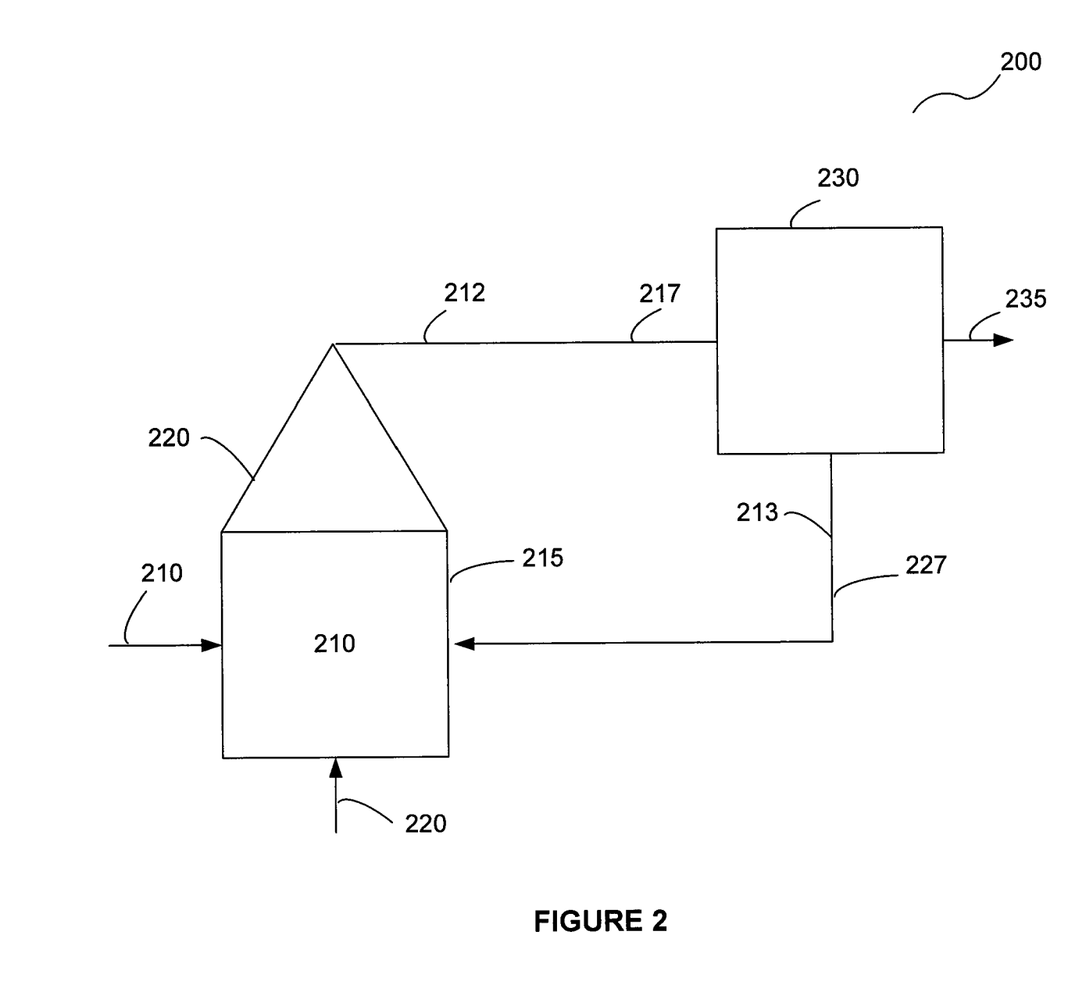
FIG. 2 is a schematic of a system comprising a storage tank, in accordance with an embodiment of the present invention.

When power is the sole desired utility, the system may be closed-loop to reduce the amount of fluid medium for running the system, thereby increasing power-producing efficiency. A closed-loop system is illustrated in FIG. 2, which depicts the de-energized medium 213 exiting converter 230 via conduit 227 and recycling back to storage tank 215, thus eliminating or reducing the need for external re-supply of medium 210.

Conduit may be any hollow structure suitable for transferring the fluid medium between the various system components. The conduit may be any desired shape (e.g., cylindrical or rectangular) and may comprise any desired cross-sectional area. The conduit may comprise any suitably rigid material, such as plastic, fiberglass, or metal. In an exemplary embodiment, the conduit is configured to further enhance the energy of the fluid medium. For example, the conduit may be configured to have a smaller cross-sectional area than the storage tank to increase the kinetic energy (i.e., velocity) of the medium. Moreover, the conduit may comprise one or more energy enhancing devices, such as a nozzle, and/or solar concentrators. For example, the conduit may comprise a partially or fully mirrored half so as to further focus solar energy on the medium within. In another embodiment, the conduit comprises a refractive material configured to concentrate solar energy on said medium located within. Solar concentrators are discussed in more detail below.

In an exemplary embodiment, the system comprises one or more safety features. A safety feature may be any device, structure or apparatus which minimizes or prevents the system from reaching unsafe conditions. For example, any system component, such as the storage tank, solar concentrator, conduits, converter, and/or collection tank may comprise one or more temperature and/or pressure gauges, fluid level indicators, alarms or other notification devices, sensors, and/or relief valves. The safety features may be manually or automatically operated. Moreover, the system may be configured to shut-down automatically if an unsafe condition is achieved, such as a failure of a system component, blockage in the system, or an unsafe temperature or pressure is reached. The system may comprise a control system to facilitate operation of the safety features. The control system may comprise a user-interface and/or other operating features, and may be configured to maintain the system at pre-set thresholds. In another exemplary embodiment, the system comprises a safety cooling system. For example, the system may be configured with one or more heat exchangers, such that when the system becomes excessively heated, a cooling fluid (e.g., water) is released into one or more system components to cool the system.

In an exemplary embodiment, solar energy (i.e., sunlight) is applied directly to the storage tank containing the fluid medium. In another exemplary embodiment, the system further comprises one or more solar energy concentrators. A solar energy concentrator may be any device or apparatus which increases the amount of solar energy applied to a stored medium. For example, a solar concentrator may comprise one or more mirrors, lenses, parabolic dishes, prisms, and/or other reflective or refractive optics configured to concentrate and/or focus energy from the sun. Moreover, the solar concentrator may comprise any suitable material. For example, a reflective solar concentrator may comprise a reflective material, such as aluminum and/or silver, and a refractive concentrator may comprise any suitably refractive material, such as glass and/or crystal.

Figure 3:
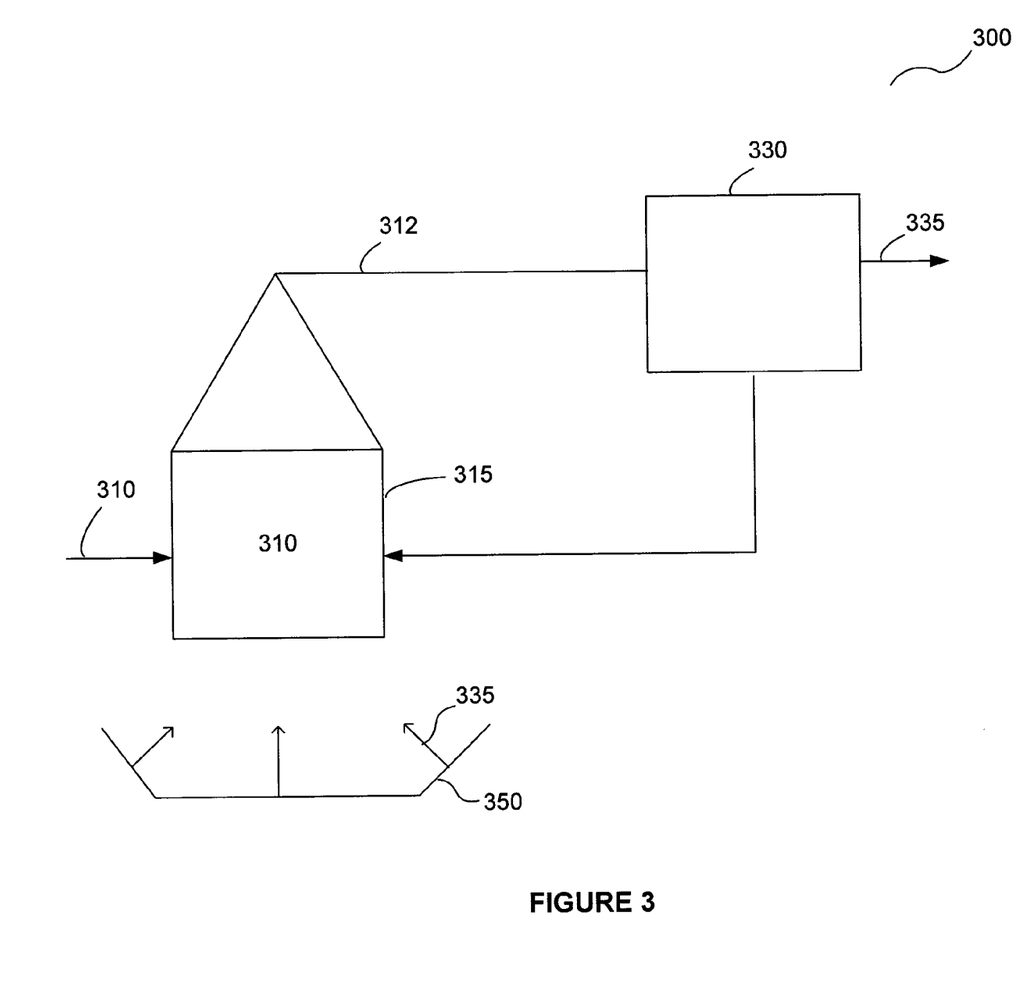
FIG. 3 is a schematic of a system comprising a solar concentrator, in accordance with an embodiment of the present invention.

Concentrators may be any size, shape (e.g., flat, curved, concave, and convex), angle, and may be positioned at any distance relative to one or more of the system components. Moreover, the concentrator may be arranged in any suitable configuration. For example, the concentrator may be aligned, or configured in an array, so as to optimize application of solar energy. For example, with reference to FIG. 3, system 300 comprises a solar concentrator (e.g., mirror 350) configured to focus solar energy 355 on storage tank 315, thereby heating medium 310 located within. Heated medium 312 is transported to converter 330, thereby producing power 335.

The system may further comprise one or more devices which track the movement of the sun, such as a heliostat and/or the like. In accordance with an exemplary embodiment, the solar concentrators are configured to move and/or rotate to track the path of the sun. For example, the concentrators may be configured to move such that the sun rays are always incident to the concentrator at the same angle, thus maximizing use of available sunlight.

In an exemplary embodiment, the system may be configured to produce heated and/or potable water. The heated water may be used for cooking, laundry, bathing, heating spas and swimming pools, and/or the like, thus replacing or augmenting standard water heaters. In another embodiment, the water may be allowed to cool to a temperature suitable for drinking. An exemplary system for producing purified and/or heated water comprises a water fluid medium, a storage tank, a solar concentrator, and a collection tank.

Figure 4:
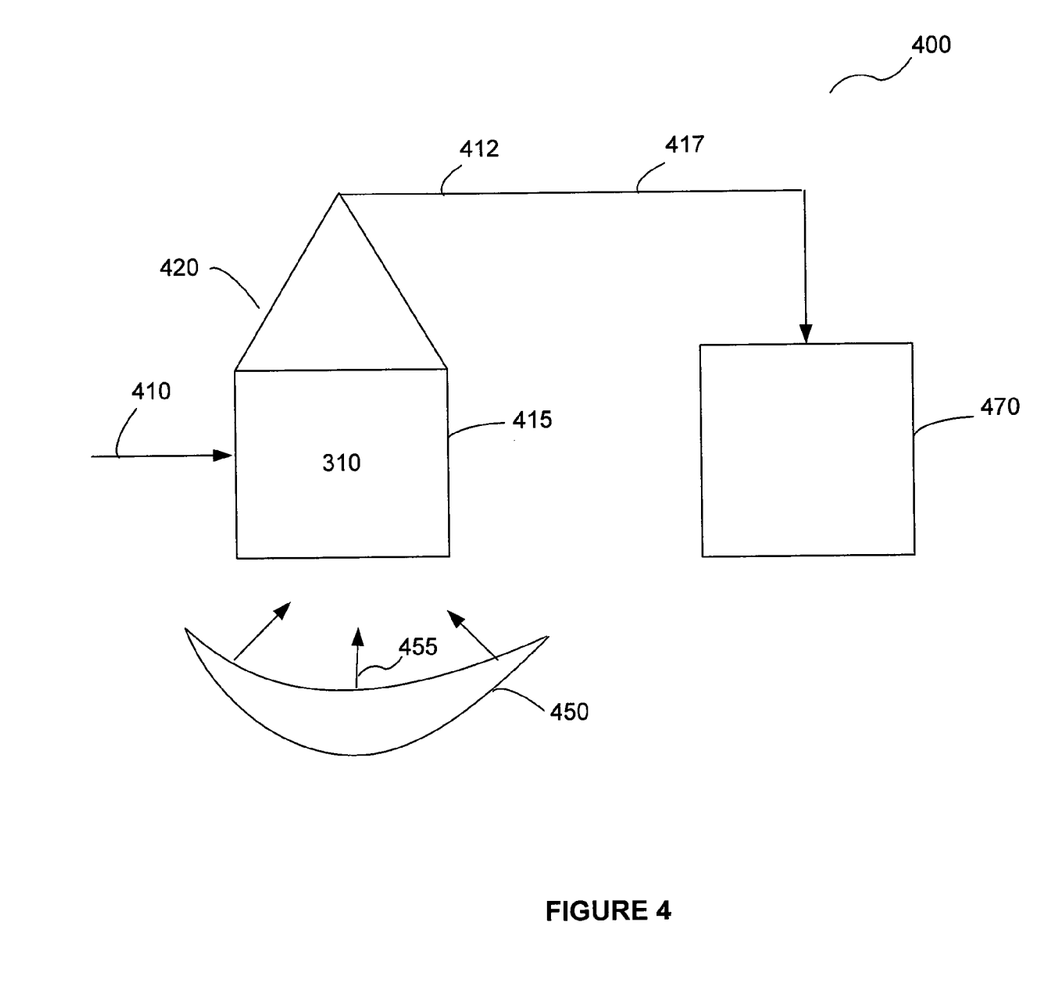
FIG. 4 is a schematic of a system configured for providing heated and/or potable water, in accordance with an embodiment of the present invention.

A collection tank may be any structure suitable for containing heated water. The tank may be any suitable size and shape, and may comprise any material suitable to withstand a high temperature medium. For example, with reference to FIG. 4, medium (e.g., water 410) is supplied to storage tank 415. Water 410 is heated using solar concentrator (e.g., parabolic dish 450) to focus sun rays 455 on storage tank 415, thus transferring energy to medium 410. The heated medium 412 exits storage tank 415 through funnel 420, and is transported to collection tank 470 via conduit 417.

Figure 5:
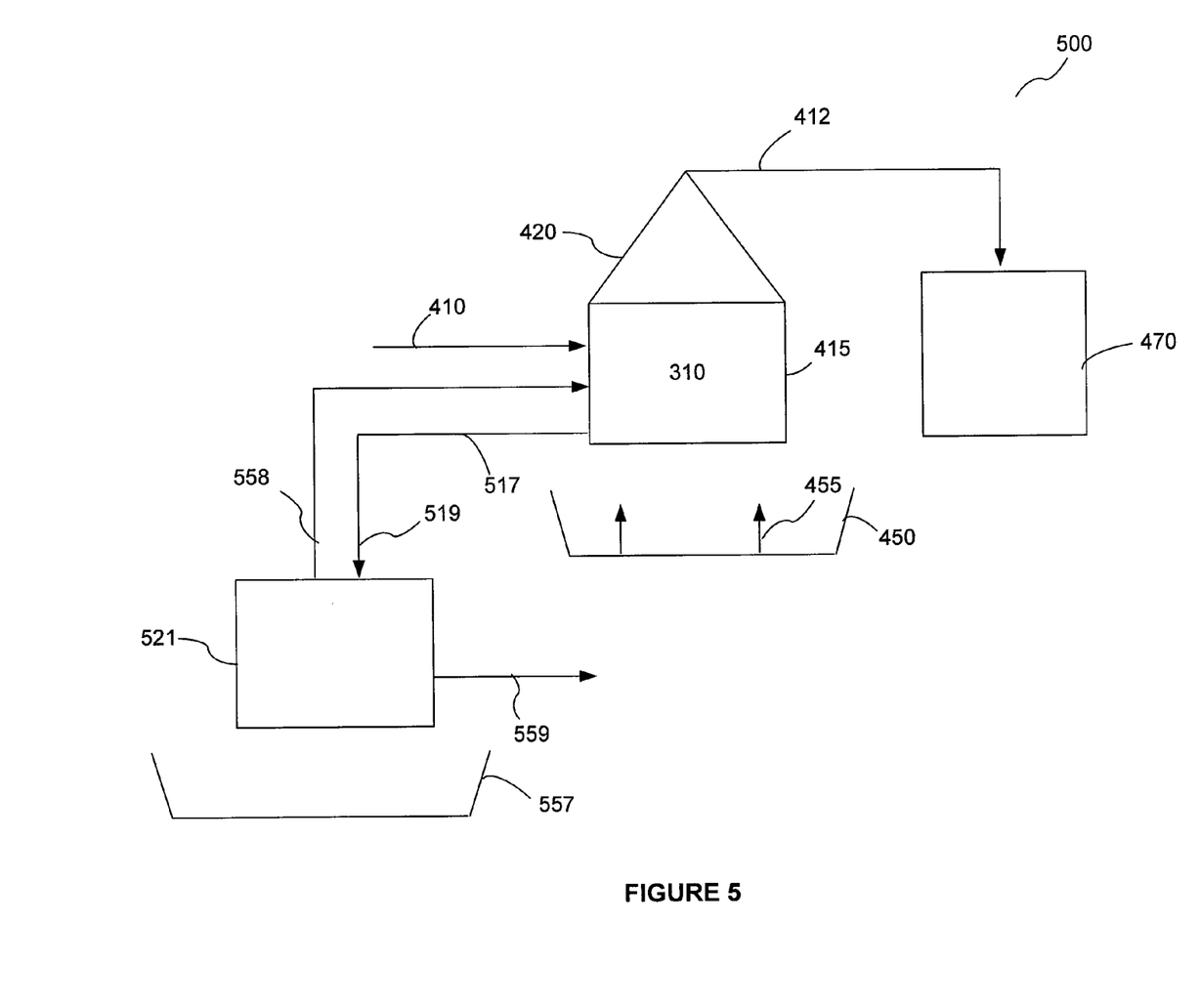
FIG. 5 is a system comprising a dehydration tank, in accordance with an embodiment of the present invention.

In an exemplary embodiment, a system may further comprise a dehydration tank. A dehydration tank may be any structure suitable for containing fluid medium residual materials, which remain in the storage tank after applying solar energy. Examples of residual materials include salt, organic waste, and various minerals. In an exemplary embodiment, residual materials are removed from the storage tank via a waste conduit and transported to the dehydration tank. The dehydration tank may comprise one or more solar concentrators to further dehydrate and/or otherwise process the residual medium materials. The dehydration of the waste may reduce its size so as to facilitate storage and/or disposal. For example, as depicted in FIG. 5, as system 500 operates, residual medium 517 is removed from storage tank 415 via waste conduit 519 and transported to dehydration tank 521. Solar concentrator 557 further dehydrates the materials creating a solid waste product 559, and purified water 558 is recycled back to storage tank 415 via conduit 558.

The system may be configured to continuously remove residual materials from the storage tank and/or dehydration tank, or may remove the materials as a batch process. In accordance with an exemplary embodiment, the desirable components of the waste product such as salt and/or minerals may be harvested, or the waste product may be disposed of, or organic materials may be recycled as fertilizer, mulch, and/or the like. In an exemplary embodiment, the system is operable to recover minerals, salts, and/or other materials from ocean water.

In an exemplary embodiment, the system may be used to separate oil from a medium that has been contaminated from an oil spill. For example, the system may further comprise a separating device, such as a centrifuge, configured to facilitate separation of the minerals from the ocean water. The oil may be recovered as a residue. In another embodiment, the system is operable to recover oil in a reusable form. For example, the medium may be heated quickly to cause the oil to "flash" precipitate out of the medium.

In another exemplary embodiment, the system may be used to separate materials. For example, the system may be used to separate one or more materials from a contaminant, such as oil from sand (i.e, an oil-contaminated beach). In such an embodiment, the material is placed in a tank and a medium, such as water, is added to separate contaminant from the material. The medium containing the contaminant may transferred to a dehydration tank and solar-heated to separate the medium from the residual contaminant. This process may be repeated, or the system may comprise multiple tanks connected in series to enhance purification.

In another embodiment, the contaminant may comprise an evaporation point that is lower than that of the medium. As such, the system may be configured such that the contaminant is removed from the tank upon application of solar energy, leaving the residual medium.

Figure 6:
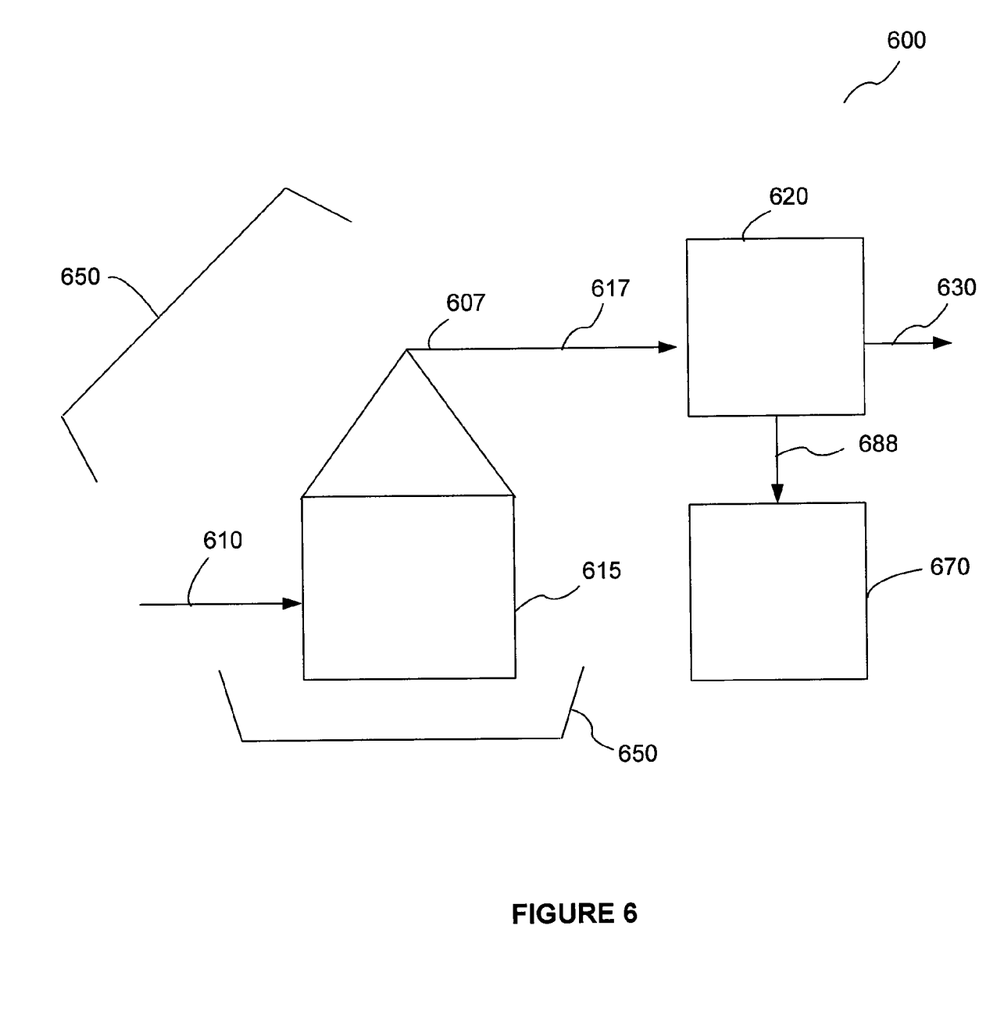
FIG. 6 is a schematic of a system configured to produce power and water, in accordance with an embodiment of the present invention.

In accordance with an exemplary embodiment, a system may be configured to simultaneously produce any desired combination of power, heated water, and/or potable water. FIG. 6 illustrates exemplary system 600. As shown, water 610 is supplied to storage tank 615. Water 610 is heated to steam using solar concentrators 650. Steam 607 is supplied to converter 620 via conduit 617 to generate electricity 630. As shown, heated water 688 is collected in collection tank 670.

Figure 7:
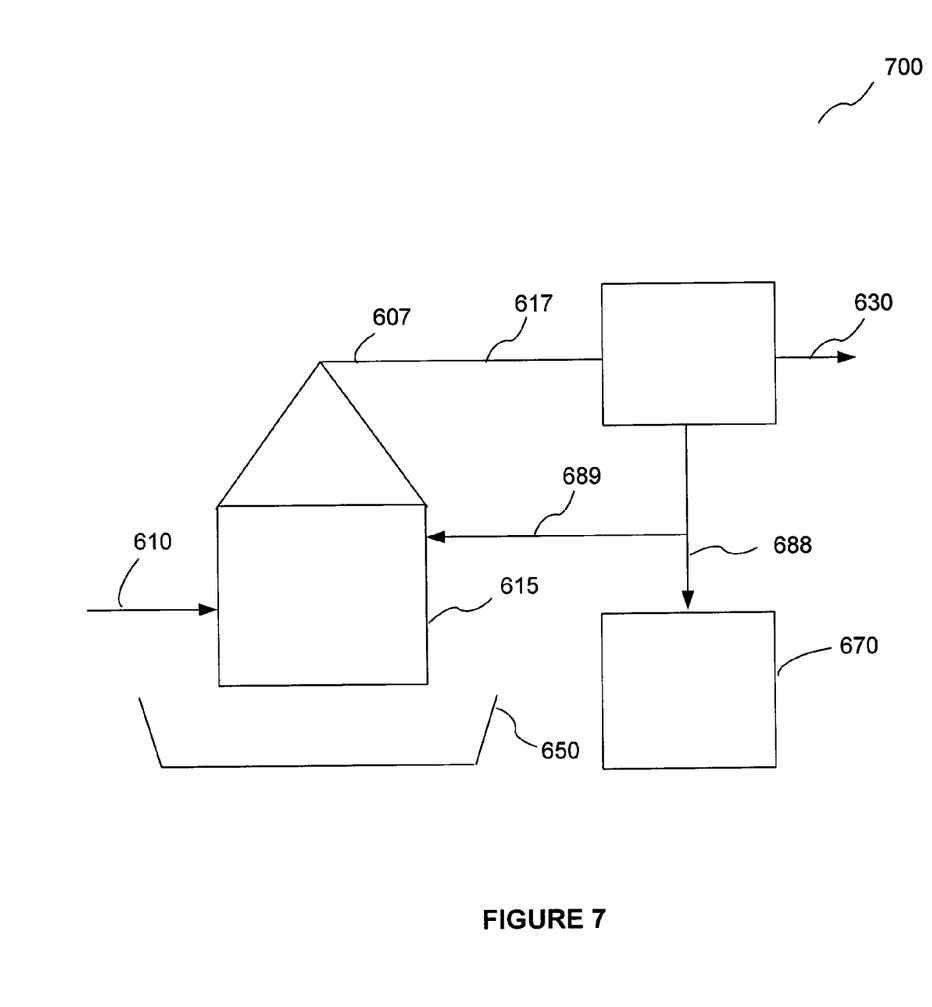
FIG. 7 is a schematic of a system configured to produce power and water comprising a recycle stream, in accordance with an embodiment of the present invention.

In accordance with another exemplary embodiment shown in FIG. 7, a portion of heated water 688 is discharged from converter 620 into collection tank 670, and a portion of heated water 689 is recycled back to container 615 for reuse. It will be understood that the feeds may be adjusted/optimized such that any desired portion of medium (0-100%) may be recycled and/or collected.

Figure 8:
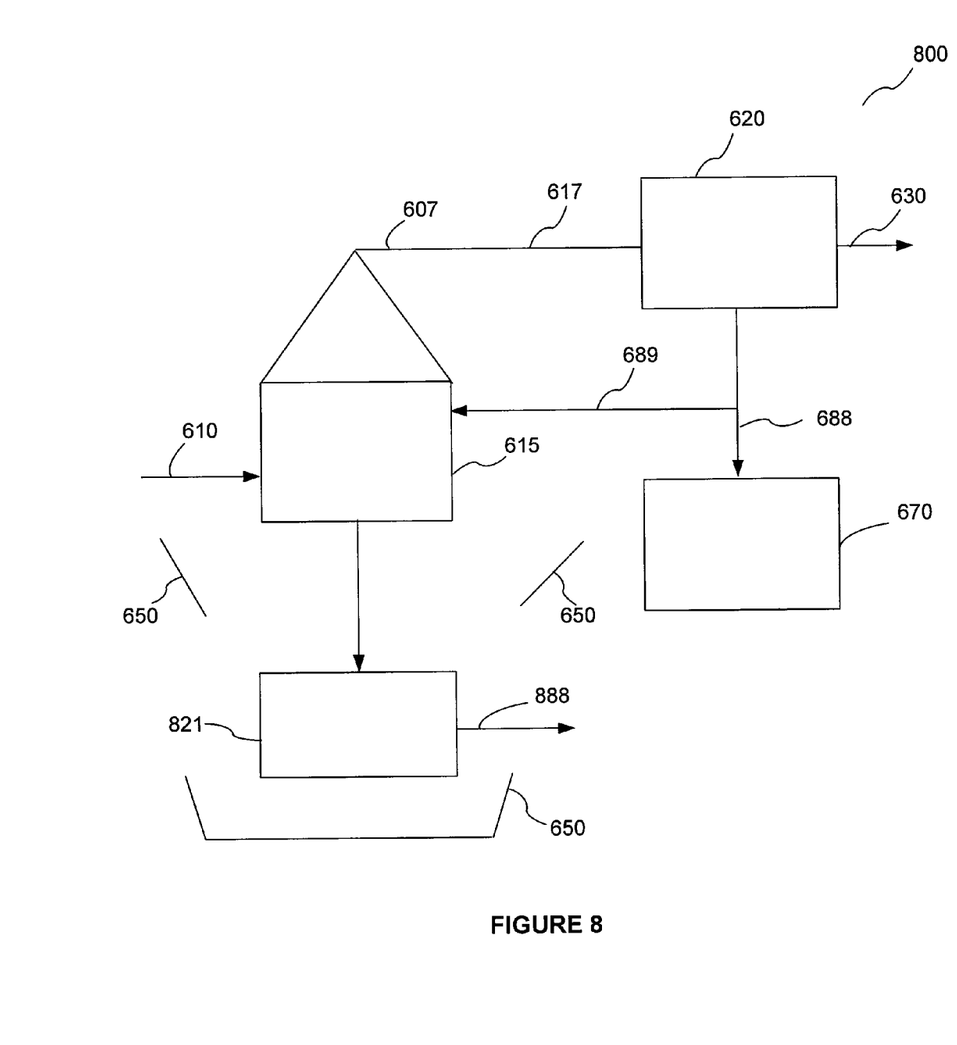
FIG. 8 is a schematic of a system configured to produce power and water comprising a recycle stream and a dehydration tank, in accordance with an embodiment of the present invention.
Figure 9:
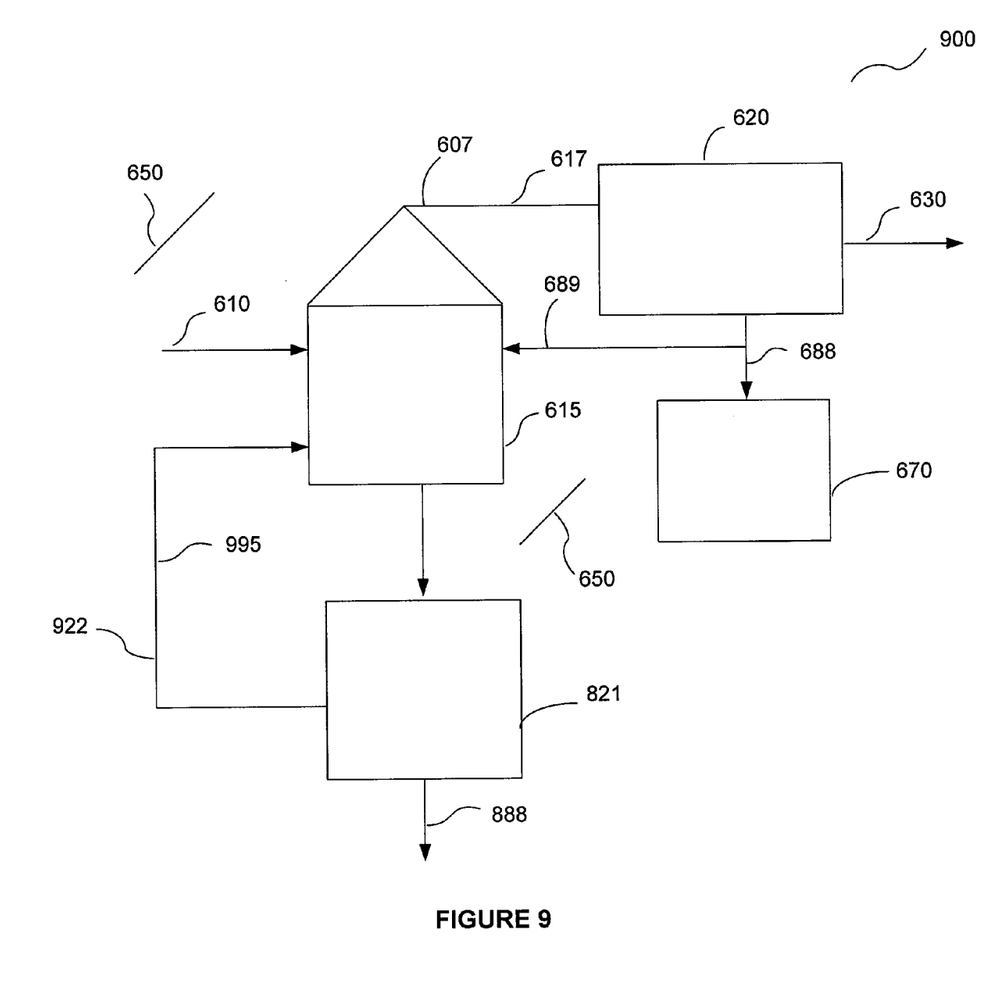
FIG. 9 is a schematic of a system comprising a waste recycle stream, in accordance with an embodiment of the present invention.

In the exemplary embodiment illustrated in FIG. 8, system 800 further comprises dehydration tank 821 configured to produce concentrated waste 888. As shown in FIG. 9, system 900 further comprises waste recycle conduit 992 configured to recycle purified water 995 to storage tank 615 for reuse.

In another exemplary embodiment, the system is configured to reduce the amount of energy required to operate when solar energy is not available, such as at night. For example, the system may comprise a tank configured to contain a conductive material. The conductive material can be any substance which stores heat energy, such as various metals, silicon and/or the like. The conductive material is heated during the day using solar energy. The material retains the heat, thus requiring less energy (i.e., supplied by gas, batteries and/or coal) to operate the system when solar energy is not available.

Such systems may be useful in energy-scarce situations, such as at night, on boats, underground or other situations where capacity is limited.

In accordance with an exemplary method of the present invention, a utility is produced by assembling one or more system components, and the medium is stored therein. For example, a method may comprise assembling any of a converter, a storage tank, an energy enhancing device, a conduit, a safety feature, a collection tank, a solar concentrator, a dehydration tank alone or in any desired combination to produce a utility. It will be understood that the system components may be assembled in any desired configuration and fall within the scope of the method of the present invention.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." All structural and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

The invention claimed is:

1. A solar-powered system for providing a utility comprising:
   a fluid medium having energy, wherein said fluid medium is selected from a group consisting of water and air;
   a storage tank configured to contain said fluid medium, wherein said storage tank comprises a funnel-shaped exit portion connected to a conduit;
   a solar concentrator configured to focus solar rays at said fluid medium stored in said storage tank, thereby increasing said energy of said fluid medium, wherein said solar concentrator is selected from a group consisting of a mirror, a prism, and a lens, and wherein said solar concentrator is parabolic and configured to move to track a path of the sun;
   a converter operable to convert said energy of said fluid medium to power, wherein said converter is a steam turbine;
   said conduit operable to transport said fluid medium in said storage tank to said converter, wherein said conduit comprises a nozzle operable to increase kinetic energy of said fluid medium contained within said conduit, a bottom half having a mirror operable to focus solar energy at said fluid medium, and a refractive material operable to focus solar energy at said fluid medium contained within;
   a safety feature selected from a group consisting of a pressure gauge, a temperature gauge, an alarm, and a heat exchanger;
   a heliostat;
   a collection tank configured to collect said fluid medium processed through said converter; and
   a dehydration tank configured to contain residual materials remaining in said storage tank after applying solar energy,
   wherein said system is configured to be substantially closed-loop and is configured to recycle at least a portion of said fluid medium exiting said converter back to said storage tank.

2. The system of claim 1, wherein said residual materials comprise at least one of salt, minerals, and organic waste.

3. The system of claim 1, wherein said dehydration tank further comprises a solar concentrator configured to direct solar energy at said dehydration tank in order to remove water from said residual materials.

4. The system of claim 1, wherein at least a portion of said removed water is recycled back to said storage tank.

5. The system of claim 1, wherein at least a portion of said residual materials is recycled as fertilizer.

* * * * *